(12) United States Patent
Harmon et al.

(10) Patent No.: US 11,904,951 B2
(45) Date of Patent: *Feb. 20, 2024

(54) EXTENDABLE CARGO BED FLOOR

(71) Applicant: Ford Global Technologies, LLC, Dearborn, MI (US)

(72) Inventors: Michael John Harmon, Northville, MI (US); Ryan Mathew Sandor, North Wales, PA (US); Matthew B. Rutman, Canton, MI (US); Vincent Anthony Chimento, Plymouth, MI (US); Dragan B. Stojkovic, Taylor, MI (US); Jack Marchlewski, Saline, MI (US); Amol Borkar, Nagpur (IN); Kirk E. Sanborn, Shelby Township, MI (US); Ronald Meredith, Waterford, MI (US); Scott Culver Anderson, Commerce Township, MI (US); Daveanand Singh, Arlington, VA (US); Hussain Z Tajmahal, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/673,851

(22) Filed: Feb. 17, 2022

(65) Prior Publication Data
US 2023/0257031 A1 Aug. 17, 2023

(51) Int. Cl.
*B62D 33/027* (2006.01)
*B60P 3/40* (2006.01)
(Continued)

(52) U.S. Cl.
CPC ............ *B62D 33/0273* (2013.01); *B60P 3/40* (2013.01); *B62D 33/08* (2013.01); *B60R 3/02* (2013.01)

(58) Field of Classification Search
CPC .... B62D 33/02; B62D 33/0273; B62D 33/08; B62D 25/2054; B60P 3/40; B60P 3/423; B60P 1/003; B60P 1/6427; B60R 3/02
See application file for complete search history.

(56) References Cited

U.S. PATENT DOCUMENTS 2,898,146 A * 8/1959 Yudenfreund ..... B62D 25/2054
296/39.1
5,523,926 A * 6/1996 Gold ..................... B60Q 1/324
340/472

(Continued)

OTHER PUBLICATIONS

Multi-Flex Tailgate, 2021 Chevy Silverado, retrieved from https://www.chevrolet.com/new-roads/trucks/silverado-multi-flex-tailgate on Jan. 18, 2022.

(Continued)

*Primary Examiner* — Gregory A Blankenship
(74) *Attorney, Agent, or Firm* — Vichit Chea; Carlson, Gaskey & Olds, P.C.

(57) ABSTRACT

A cargo bed system includes a floor assembly for a cargo bed of a vehicle. The floor assembly is configured to transition back and forth between a standard floor position and an extended floor position. The floor assembly includes a plurality of floor sections each having a cargo support surface. The floor sections are folded when the floor assembly is in the standard floor position. The floor sections are unfolded when the floor assembly is in the extended floor position.

18 Claims, 3 Drawing Sheets

(51) Int. Cl.
  *B62D 33/08* (2006.01)
  *B60R 3/02* (2006.01)

(56) References Cited

U.S. PATENT DOCUMENTS

| | | | |
|---|---|---|---|
| 6,193,294 B1 * | 2/2001 | Disner | B62D 33/08 |
| | | | 296/26.11 |
| 6,481,772 B1 * | 11/2002 | Tenn | B60N 2/3013 |
| | | | 296/65.01 |
| 6,648,569 B2 | 11/2003 | Douglass et al. | |
| 7,354,090 B1 * | 4/2008 | Pomorski | B60P 3/40 |
| | | | 296/26.11 |
| 7,699,373 B2 | 4/2010 | Miller | |
| 7,967,356 B2 | 6/2011 | Stackpole | |
| 8,109,552 B2 | 2/2012 | Nelson | |
| 8,499,870 B2 * | 8/2013 | Nakamura | F02M 35/048 |
| | | | 180/68.3 |
| 8,552,852 B1 * | 10/2013 | Hertz | B60Q 7/02 |
| | | | 340/471 |
| 8,585,116 B2 * | 11/2013 | King | B60N 2/3065 |
| | | | 296/65.01 |
| 9,409,608 B2 | 8/2016 | Waskie et al. | |
| 10,350,972 B2 * | 7/2019 | Azzouz | B60J 5/00 |
| 10,661,842 B2 | 5/2020 | Povinelli et al. | |
| 11,059,423 B1 * | 7/2021 | Weaver | B62D 33/027 |
| 2009/0039675 A1 * | 2/2009 | King | B60P 3/423 |
| | | | 296/182.1 |
| 2010/0019539 A1 * | 1/2010 | Nakamura | B62D 33/0625 |
| | | | 296/190.04 |
| 2011/0148145 A1 * | 6/2011 | Nishiike | B62D 33/0273 |
| | | | 296/182.1 |
| 2011/0156423 A1 * | 6/2011 | Kawabata | B60N 2/305 |
| | | | 296/183.1 |
| 2011/0156424 A1 * | 6/2011 | Orihashi | B60N 2/36 |
| | | | 296/65.01 |
| 2011/0156425 A1 * | 6/2011 | Kokawa | B62D 33/08 |
| | | | 296/65.01 |
| 2012/0193932 A1 * | 8/2012 | King | B62D 47/003 |
| | | | 296/26.11 |
| 2015/0225024 A1 | 8/2015 | Newberry | |
| 2016/0214657 A1 | 7/2016 | Topolovec et al. | |
| 2016/0236724 A1 | 8/2016 | Borges Filho et al. | |
| 2017/0158254 A1 * | 6/2017 | Singer | B62D 21/14 |
| 2018/0362099 A1 * | 12/2018 | Reyna | B62D 33/0273 |
| 2019/0308674 A1 * | 10/2019 | Crawford | B62D 33/02 |
| 2019/0329713 A1 * | 10/2019 | Sharma | B62D 33/023 |
| 2020/0361389 A1 * | 11/2020 | Leitner | B60R 3/02 |
| 2021/0188368 A1 | 6/2021 | Williams et al. | |
| 2022/0161870 A1 * | 5/2022 | Horner | B60R 3/02 |
| 2022/0289312 A1 * | 9/2022 | Aquila | B60R 5/02 |
| 2022/0314888 A1 * | 10/2022 | Glickman | B60D 1/01 |
| 2022/0396319 A1 * | 12/2022 | Christensen | B62D 33/0273 |
| 2023/0256891 A1 * | 8/2023 | Harmon | B62D 33/08 |
| | | | 296/26.08 |
| 2023/0256910 A1 * | 8/2023 | Harmon | B62D 33/0273 |
| | | | 296/62 |
| 2023/0257031 A1 * | 8/2023 | Harmon | B60P 3/40 |
| | | | 296/26.08 |
| 2023/0257034 A1 * | 8/2023 | Harmon | B60P 3/40 |
| | | | 296/26.09 |

OTHER PUBLICATIONS

Canoo, Pickup Truck, retrieved from https://www.canoo.com/pickup/ on Jan. 18, 2022.

* cited by examiner

EXTENDABLE CARGO BED FLOOR

TECHNICAL FIELD

This disclosure relates generally to a cargo bed of a vehicle and, more particularly, to a cargo bed that can be extended.

BACKGROUND

Some vehicles, such as pickup trucks, include a cargo bed. Users utilize cargo beds to carry various types of cargo. The cargo bed can be located behind a passenger compartment of the vehicle. A tailgate can enclose an aft end of the cargo bed.

SUMMARY

In some aspects, the techniques described herein relate to a cargo bed system, including: a floor assembly for a cargo bed of a vehicle, the floor assembly configured to transition back and forth between a standard floor position and an extended floor position, the floor assembly including a plurality of floor sections each having a cargo support surface, the floor sections folded when the floor assembly is in the standard floor position, the floor sections unfolded when the floor assembly is in the extended floor position.

In some aspects, the techniques described herein relate to a cargo bed system, wherein the plurality of floor sections include a plurality of pivotable floor sections that are folded against one another when the floor assembly is in the standard floor position.

In some aspects, the techniques described herein relate to a cargo bed system, wherein the plurality of pivotable floor sections fold and unfold like an accordion.

In some aspects, the techniques described herein relate to a cargo bed system, wherein the plurality of floor sections includes no more than two pivotable floor sections.

In some aspects, the techniques described herein relate to a cargo bed system, wherein the floor sections includes at least one slidable floor section that slides when the floor assembly is transitioned back-and-forth between the standard floor position and the extended floor position.

In some aspects, the techniques described herein relate to a cargo bed system, wherein the at least one slidable floor section slides, without pivoting, when the floor assembly is transitioned back-and-forth between the standard floor position and the extended floor position.

In some aspects, the techniques described herein relate to a cargo bed system, wherein at least some of the floor sections are stacked against one another and stacked against a front wall of the cargo bed when the floor assembly is in the standard floor position.

In some aspects, the techniques described herein relate to a cargo bed system, wherein, when the floor assembly is in the standard floor position, the cargo support surface of one of the floor sections faces forward along a longitudinal axis of the vehicle, and the cargo support surface of another of the floor sections faces aft along a longitudinal axis of the vehicle.

In some aspects, the techniques described herein relate to a cargo bed system, wherein the floor sections are disposed next to each other along a longitudinal axis of the vehicle when unfolded and when the floor assembly is in the extended floor position.

In some aspects, the techniques described herein relate to a cargo bed system, wherein the cargo support surfaces of the floor sections each face vertically upward when unfolded and when the floor assembly is in the extended floor position.

In some aspects, the techniques described herein relate to a cargo bed system, further including a tailgate having a first door and a second door, the first door configured to pivot about a first vertically extending axis back and forth between a closed position and a fully open position, the second door configured to pivot about a second vertically extending axis back and forth between a closed position and a fully open position.

In some aspects, the techniques described herein relate to a cargo bed system, wherein the first door provides a driver side wall for an extended portion of the floor assembly when the floor assembly is in the extended floor position, wherein the first door provides a passenger side wall for an extended portion of the floor assembly when the floor assembly is in the extended floor position.

In some aspects, the techniques described herein relate to a cargo bed system, further including an auxiliary light on a side of first door that faces rearward when the first door is in the fully open position, and an auxiliary light of a side of the second door that faces rearward when the second door is in the fully open position.

In some aspects, the techniques described herein relate to a cargo bed system, further including at least one step deployable from beneath the cargo bed.

In some aspects, the techniques described herein relate to a cargo bed adjustment method, including: transitioning a floor assembly for a cargo bed of a vehicle from a standard floor position and an extended floor position by unfolding a plurality of floor sections of the floor assembly.

In some aspects, the techniques described herein relate to a method, wherein the plurality of floor sections are folded against a front wall of the cargo bed when the floor assembly is in the standard floor position, wherein the plurality of floor sections are unfolded when the floor assembly is in the extended floor position.

In some aspects, the techniques described herein relate to a method, wherein the plurality of floor sections are pivotably connected to each other.

In some aspects, the techniques described herein relate to a method, wherein the plurality of floor sections are pivotable floor sections, and further including sliding a slidable floor section to unfold the pivotable floor sections.

In some aspects, the techniques described herein relate to a method, further including opening a first door and a second door of a tailgate assembly prior to the transitioning.

In some aspects, the techniques described herein relate to a method, wherein the first door provides a driver side wall for an extended portion of the floor assembly when the floor assembly is in the extended floor position, wherein the first door provides a passenger side wall for an extended portion of the floor assembly when the floor assembly is in the extended floor position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a vehicle having a cargo bed that can be extended. A floor of the cargo bed can move from a folded position to an unfolded position when the cargo bed is extended. The floor is part of a cargo bed system With reference to FIG. 1, a vehicle 10 includes a passenger compartment 14 and a cargo bed 18 that is aft the passenger compartment 14 along a longitudinal axis A of the vehicle 10.

In the exemplary embodiment, the vehicle 10 is a pickup truck. The vehicle 10 could be another type of vehicle in another example, such as a car, van, sport utility vehicle, etc. The vehicle has a unibody architecture. In another embodiment, the vehicle 10 could have a body-on-frame architecture.

The example vehicle 10 is an electrified vehicle. In particular, the vehicle 10 is a battery electric vehicle. In another example, the vehicle 10 could be another type of electrified vehicle, such as a plug-in hybrid electric vehicle (PHEV), or a conventional vehicle.

The example vehicle 10 includes an electrified powertrain capable of applying a torque from an electric machine (e.g., an electric motor) to drive one or more drive wheels 22. The vehicle can include a traction battery pack, which powers the electric machine and, potentially, other electrical loads of the vehicle 10. The powertrain of the vehicle 10 may electrically propel the drive wheels 22 either with or without the assistance of an internal combustion engine.

Figure 1:
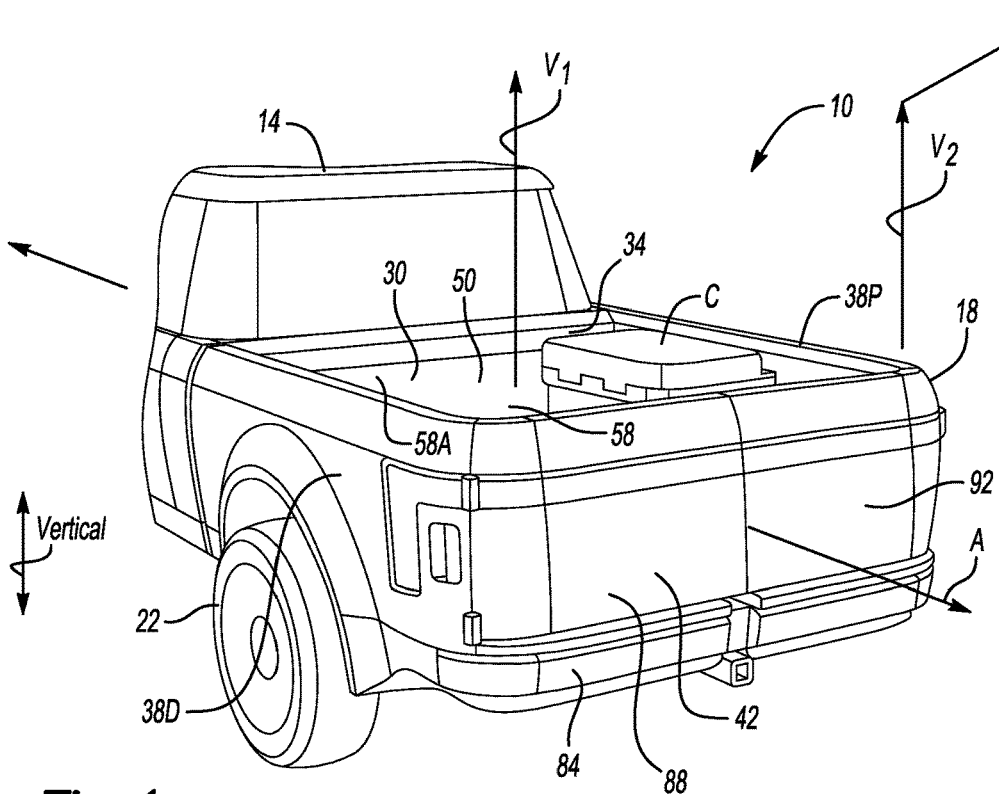
FIG. 1 illustrates a vehicle having a cargo bed with the cargo bed in a standard bed position.

FIG. 1 shows the cargo bed 18 in a standard bed position and holding cargo C. The cargo bed 18 can be transitioned from the standard bed position to the extended bed position shown in FIG. 2. In the extended bed position, the cargo bed 18 can transport cargo C', which is larger than the cargo C shown in FIG. 1. The cargo C' may be too large to comfortably fit in the cargo bed 18 when the cargo bed 18 is in the standard bed position, which causes the user to transition the cargo bed 18 to the extended bed position.

Generally, the cargo bed 18 includes a floor assembly 30, a front wall 34, a driver side wall 38D, a passenger side wall 38P, and a tailgate assembly 42. When the cargo bed 18 is in the extended bed position, a rear gates 46 of the tailgate assembly 42 are rotated out to enclose an aft end of the cargo bed 18. In another example, the tailgate assembly 42 lacks the rear gates 46 and a separate rear gate accessory is used to enclose the aft end of the cargo bed 18. The separate rear gate accessory could be used as a divider within the cargo bed 18 when the cargo bed 18 is in the standard bed position. The separate rear gate accessory could be received within slots to hold the separate rear gate accessory.

The floor assembly 30 is part of a cargo bed system used to transition the cargo bed 18 back-and-forth between the standard bed position and the extended bed position. When the cargo bed 18 is in the standard bed position, the floor assembly 30 is in a standard floor position. When the cargo bed 18 is in the extended bed position, the floor assembly 30 is in an extended floor position.

Figure 2:
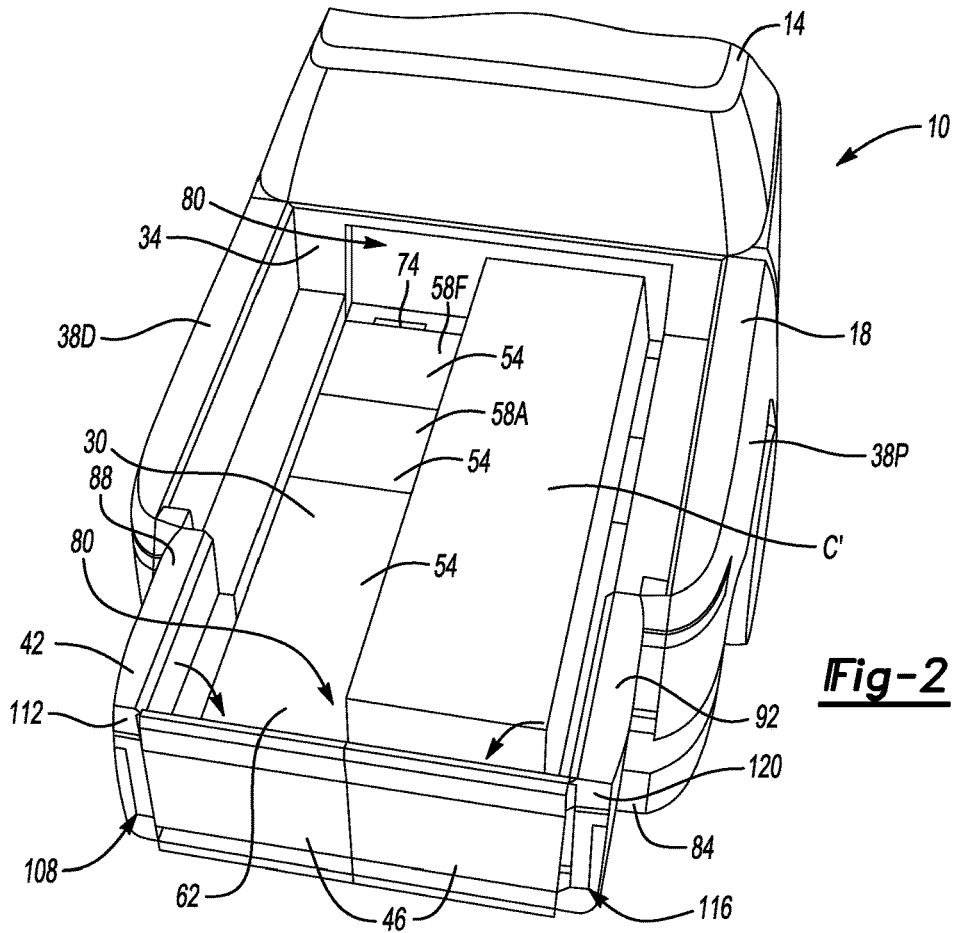
FIG. 2 illustrates the vehicle of FIG. 1 with the cargo bed in an extended bed position.
Figure 3:
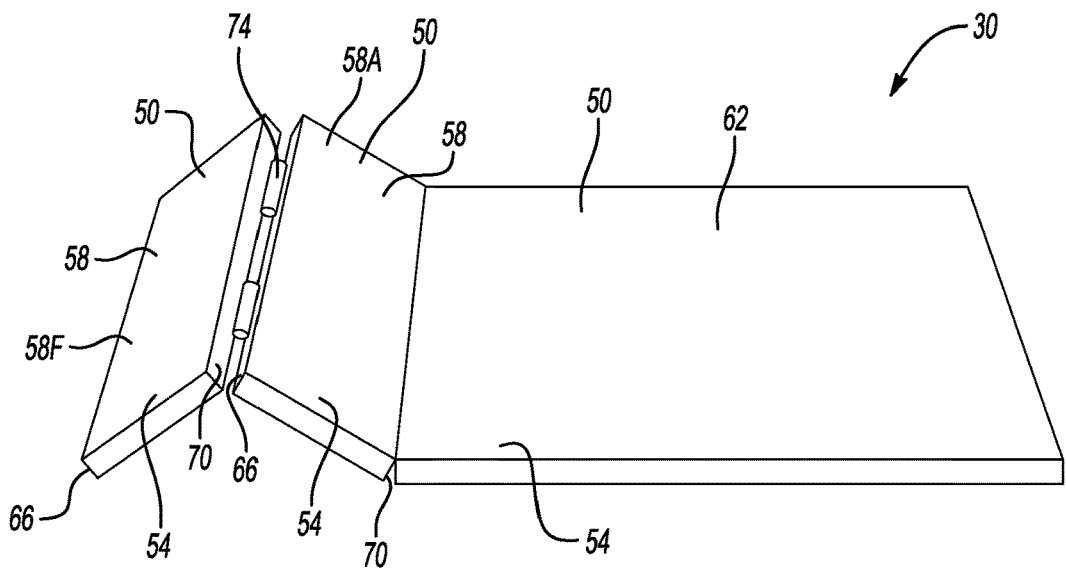
FIG. 3 illustrates a floor of the cargo bed from FIG. 1.

With reference to FIG. 3 and continuing reference to FIGS. 1 and 2, the floor assembly includes a plurality of floor sections 50 each having a cargo support surface 54. When the floor sections 50 are used to support cargo C or C', the cargo support surfaces 54 face vertically upwards and directly support and interface with the cargo C or C'. Vertical, for purposes of this disclosure, is with reference to ground and a general orientation of the vehicle 10 during ordinary operation.

In this example, the floor sections 50 of the floor assembly 30 include two pivotable floor sections 58, and one slidable floor section 62. The two pivotable floor sections 58 include a front pivotable floor section 58F and an aft pivotable floor section 58A. More than two pivotable floor sections 58 could be used in other examples. More than two pivotable floor sections 58 are not used in this example, which reduces overall part complexity.

The front pivotable floor section 58F is disposed in front of the aft pivotable floor section 58A along the longitudinal axis A of the vehicle 10. The front pivotable floor section 58F and the aft pivotable floor section 58A each include a forward edge 66 and a trailing edge 70.

In this example, the forward edge 66 of the front pivotable floor section 58F is pivotably connected to the front wall 34 of the cargo bed 18. The trailing edge 70 of the front pivotable floor section 58A is pivotably connected to the forward edge 66 of the aft pivotable floor section 58A. The trailing edge 70 of the aft pivotable floor section 58A is pivotably connected to the slidable floor section 62.

Floor hinge assemblies 74, for example, could be used to pivotably connect the front pivotable floor section 58F and the aft pivotable floor section 58A to the other structures. The hinge assemblies 74 could include a biasing member, such as a spring, to assist with transitioning the floor assembly 30 between the extended floor position and the standard floor position. The biasing member can help to prevent the front pivotable floor section 58F and the aft pivotable floor section 58A from locking up when the floor assembly 30 is transitioned. The hinge assemblies 74 could be spring loaded to help lift the trailing edge 70 of the front pivotable floor section 58F and the front edge of the aft pivotable floor section 58A as a user pushes the floor assembly 30 from the extended floor position to the standard floor position.

When the cargo bed 18 is in the standard bed position, the floor assembly 30 is in a standard floor position. In the standard floor position, the front pivotable floor section 58A and the aft pivotable floor section 58A are pivoted to a position where the front pivotable floor section 58A and the aft pivotable floor section 58A are folded together.

In this example, when the cargo bed 18 is in the standard bed position, the front pivotable floor section 58F and the aft pivotable floor section 58A are folded against one another, and folded against the front wall 34. In particular, the front pivotable floor section 58F is stacked against the front wall 34, and the aft pivotable floor section 58A is stacked against the front pivotable floor section 58F. The front pivotable floor section 58F and the aft pivotable floor section 58A can be received within a recess 80 (FIG. 2) of the front wall 34 when folded in this way.

When the cargo bed 18 is in the standard bed position, the cargo support surface 54 of the front pivotable floor section 58F faces forward along the longitudinal axis A of the vehicle 10, and the cargo support surface 54 of the aft pivotable floor section 58A faces aft along the longitudinal axis A.

The slidable floor section 62 slides when transitioning the floor assembly 30 back-and-forth between the standard floor position and the extended floor position. In this example, the slidable floor section 62 slides without pivoting when the floor assembly 30 is transitioned back-and-forth between the standard floor position and the extended floor position.

When the cargo bed 18 is in the extended bed position, the floor assembly 30 is in the extended floor position. In the extended floor position, the front pivotable floor section 58F and the aft pivotable floor section 58A are pivoted to a position where the front pivotable floor section 58F and the aft pivotable floor section 58A are unfolded. The front pivotably floor section 58F and the aft pivotable floor section 58A fold and unfold like an accordion.

In the extended floor position, the cargo support surfaces 54 of the front pivotable floor section 58F and the aft pivotable floor section 58A face upwards. In the extended floor position, the cargo support surfaces 54 of the floor sections 50 of the floor assembly 30 all face vertically upward. Also, the floor sections 50 are all disposed next to each other along the longitudinal axis A of the vehicle 10.

When in the extended bed position, the slidable floor section 62 is slid rearward such of some of the slidable floor section 62 extends rearward past a rear bumper 84 of the vehicle. This portion of the slidable floor section 62 can be considered an extended portion 80.

In this example, a user can pull on the slidable floor section 62 to transition the floor assembly 30 from the standard floor position to the extended floor position. The user can then push on the slidable floor section 62 to transition the floor assembly 30 from the extended floor position to the standard floor position. In other examples, a mechanical actuator could be used drive movement of the slidable floor section 62 back-and-forth between the standard floor position and the extended floor position. The mechanical actuators could extend and retract in response to command from a button on the vehicle 10 or an input from a handheld device, such as a smartphone. The mechanical actuator could be a screw-driven linear actuator, for example.

The tailgate 42 of the example vehicle 10 is a split tailgate having a first door 88 and a second door 92. In this example, the first door 88 is on a driver side of the vehicle 10, and the second door 92 is on the passenger side of the vehicle 10. The first door 88 and the second door 92 are similarly sized in this example. The first door 88 and the second door 92 each account for about fifty percent of the tailgate 42. The first door 88 is configured to pivot about a first vertically extending axis $V_1$ back and forth between a closed position and a fully open position. The second door 92 is configured to pivot about a second vertically extending axis $V_2$ back and forth between a closed position and a fully open position.

Figure 4:
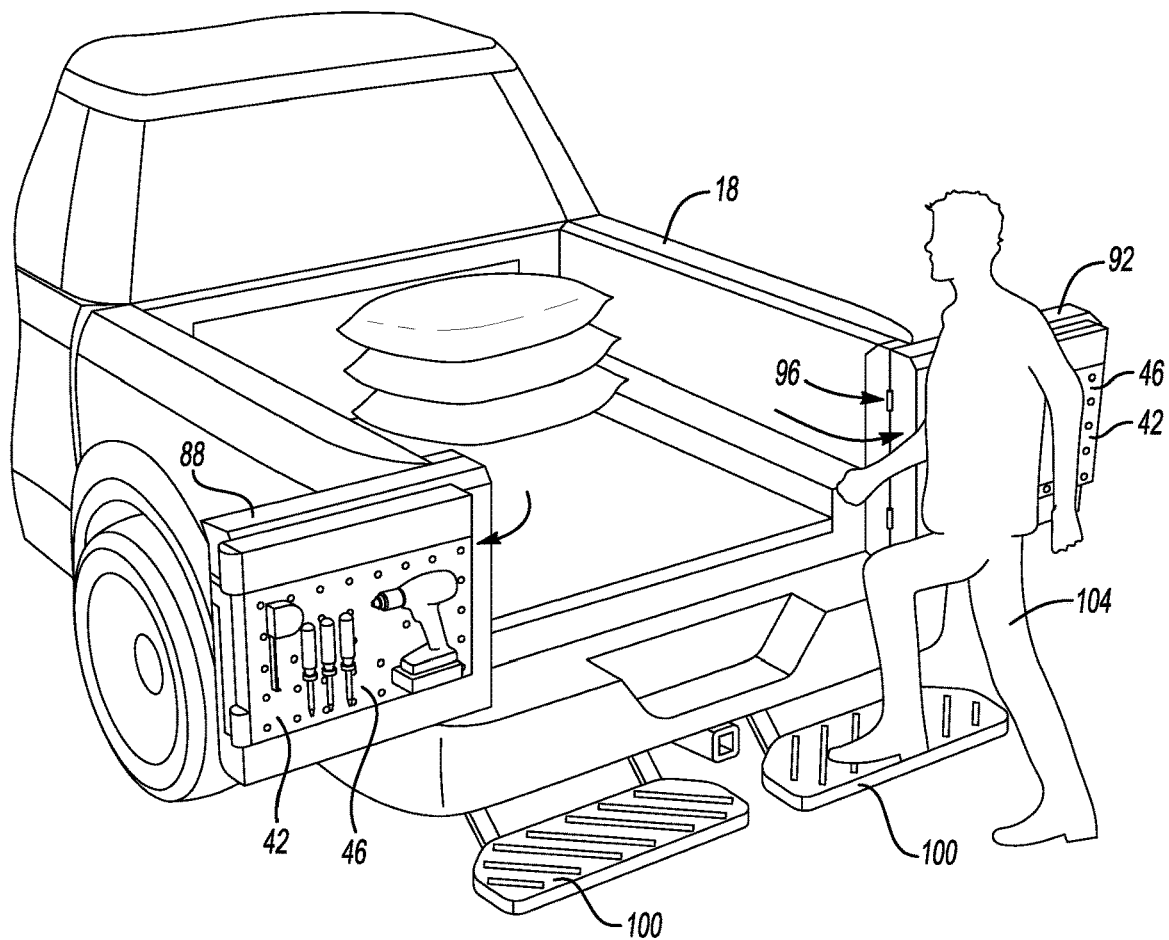
FIG. 4 illustrates the vehicle of FIG. 1 with a first door and a second door of a tailgate in fully open positions.

FIG. 4 shows the first door 88 and the second door 92 each in a fully open position. Door hinge assemblies 96 could be used, for example, to pivotably connect the first door 88 and the second door 92 to the surrounding structures to enable the first door 88 and the second door 92 to pivot back and forth between the closed position of FIG. 1 and the fully open position of FIG. 4. Tools, accessories, gear, etc., can be mounted on the first door 88 and the second door 92 as shown.

In the exemplary embodiment, the vehicle 10 includes two steps 100 that can pivot out from beneath the cargo bed 18 of the vehicle 10 to the position of FIG. 4. A user 104 can use the steps 100 when entering and when exiting the cargo bed 18. The steps 100 are shown in a deployed position in FIG. 4. When not needed, the steps 100 can be retracted beneath the vehicle 10 in a stowed position.

Figure 5:
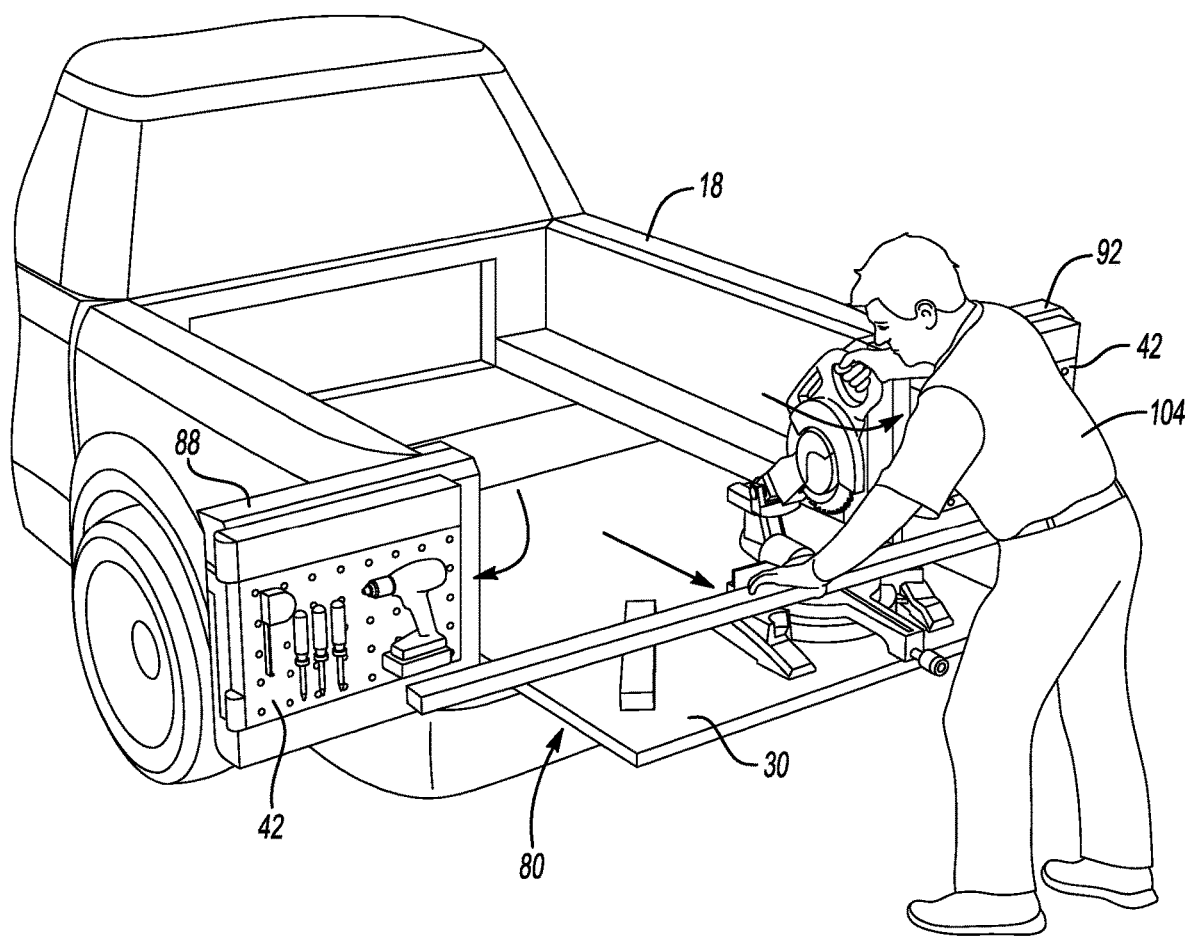
FIG. 5 illustrates the first door and the second door of the tailgate in fully open positions and the floor of the cargo bed in an extended floor position.

When the first door 88 and the second door 92 are in the fully open position, the slidable floor section 62 of the floor assembly 30 can be moved to the extended floor position as shown in FIG. 5. The user 104 can then use the floor assembly 30 as a workbench. In the configuration shown in FIG. 5, the extended portion 80 of the floor assembly 30 can be accessed from three sides.

Referring again to FIG. 2, the first door 88 and the second door 92 can be repositioned to provide a driver side wall and a passenger side wall for the extended portion 80 of the slidable floor section 62.

To transition the cargo bed 18 from the standard bed position of FIG. 1 to the extended bed position of FIG. 2, the first door 88 and the second door 92 of the tailgate 42 are pivoted to the open position shown in FIG. 2. Next, the slidable floor section 62 is slid rearward to the position of FIG. 2. Sliding the slidable floor section 62 pulls the aft pivotable floor section 58A, which pulls the front pivotable floor section 58F. This unfolds and pivots the forward pivotable floor section 58F and the aft pivotable section 58A until the cargo support surface 54 of the front pivotable floor section 58F and the cargo support surface 54 of the aft pivotable floor section 58A face upward as shown in FIG. 2.

The first door 88 has a driver side auxiliary light 108 on a side 112 of first door 88 that faces rearward when the first door 88 is providing the driver side wall for the extended portion 80. The second section 92 has passenger side auxiliary light 116 on a side 120 of the second door 92 that faces rearward when the second door 92 is providing the passenger side wall for the extended portion 80. The driver side auxiliary light 108 and the passenger side auxiliary light 116 can help the vehicle 10 meet lighting requirements when the cargo bed 18 is in the extended bed position without installing or connecting other lighting.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A cargo bed system, comprising:
   a floor assembly for a cargo bed of a vehicle, the floor assembly configured to transition back and forth between a standard floor position and an extended floor position, the floor assembly including a plurality of floor sections each having a cargo support surface,
   the plurality of floor sections including at least one pivotable floor section that is folded when the floor assembly is in the standard floor position and is unfolded when the floor assembly is in the extended floor position,
   the plurality of floor sections including at least one slidable floor section that slides when the floor assembly is transitioned back-and-forth between the standard floor position and the extended floor position.

2. The cargo bed system of claim 1, wherein the plurality of floor sections include a plurality of pivotable floor sections that are folded against one another when the floor assembly is in the standard floor position.

3. The cargo bed system of claim 2, wherein the plurality of pivotable floor sections fold and unfold like an accordion.

4. The cargo bed system of claim 2, wherein the plurality of pivotable floor sections includes no more than two pivotable floor sections.

5. The cargo bed system of claim 1, wherein the at least one slidable floor section slides, without pivoting, when the floor assembly is transitioned back-and-forth between the standard floor position and the extended floor position.

6. The cargo bed system of claim 2, wherein the plurality of pivotable floor sections are stacked against one another and stacked against a front wall of the cargo bed when the floor assembly is in the standard floor position.

7. The cargo bed system of claim 1, wherein, when the floor assembly is in the standard floor position, the cargo support surface of one of the floor sections faces forward along a longitudinal axis of the vehicle, and the cargo support surface of another of the floor sections faces aft along a longitudinal axis of the vehicle.

8. The cargo bed system of claim 1, wherein the floor sections are disposed next to each other along a longitudinal axis of the vehicle when unfolded and when the floor assembly is in the extended floor position.

9. The cargo bed system of claim 1, wherein the cargo support surfaces of the floor sections each face vertically upward when unfolded and when the floor assembly is in the extended floor position.

10. The cargo bed system of claim 1, further comprising a tailgate having a first door and a second door, the first door configured to pivot about a first vertically extending axis back and forth between a closed position and a fully open position, the second door configured to pivot about a second vertically extending axis back and forth between a closed position and a fully open position.

11. The cargo bed system of claim 10, wherein the first door provides a driver side wall for an extended portion of the floor assembly when the floor assembly is in the extended floor position, wherein the first door provides a passenger side wall for an extended portion of the floor assembly when the floor assembly is in the extended floor position.

12. The cargo bed system of claim 11, further comprising an auxiliary light on a side of first door that faces rearward when the first door is in the fully open position, and an auxiliary light of a side of the second door that faces rearward when the second door is in the fully open position.

13. The cargo bed system of claim 1, further comprising at least one step deployable from beneath the cargo bed.

14. A cargo bed adjustment method, comprising:
transitioning a floor assembly for a cargo bed of a vehicle from a standard floor position and an extended floor position by unfolding a plurality of pivotable floor sections of the floor assembly; and
sliding a slidable floor section of the floor assembly to unfold the plurality of pivotable floor sections.

15. The method of claim 14, wherein the plurality of pivotable floor sections are folded against a front wall of the cargo bed when the floor assembly is in the standard floor position, wherein the plurality of pivotable floor sections are unfolded when the floor assembly is in the extended floor position.

16. The method of claim 14, wherein the plurality of pivotable floor sections are pivotably connected to each other.

17. The method of claim 14, further comprising opening a first door and a second door of a tailgate assembly prior to the transitioning.

18. The method of claim 17, wherein the first door provides a driver side wall for an extended portion of the floor assembly when the floor assembly is in the extended floor position, wherein the first door provides a passenger side wall for an extended portion of the floor assembly when the floor assembly is in the extended floor position.

* * * * *